Patented July 30, 1940

2,209,444

UNITED STATES PATENT OFFICE 2,209,444

MANUFACTURES FROM DOLOMITIC MATERIALS

George de Becze, Budapest, Hungary

No Drawing. Application February 17, 1938, Serial No. 191,110. In Hungary and in Great Britain January 28, 1938

1 Claim. (Cl. 106—18)

This invention relates to a process for the manufacture of voluminous products from dolomite or other raw materials containing the carbonates of calcium and magnesium.

For the manufacture of magnesium compounds, in particular the carbonates of magnesium, from dolomite or other raw materials containing the carbonates of magnesium and calcium, for example magnesite containing lime or dolomitic limestone, it has already been proposed to treat the aqueous suspension of the finely ground rock under a $CO_2$ pressure of over 5 atmospheres whereby the dolomite reacts with separation of calcium carbonate and the magnesium carbonate passes into solution as bicarbonate. The separated bicarbonate solution is then further worked up. In order to obviate grinding and to open up the raw material, the latter has been burnt at temperatures at which only the magnesium carbonate or at least a large portion thereof is decomposed to magnesium oxide. Burning has also been carried out at temperatures at which the dolomite is decomposed to CaO and MgO. The oxides were then worked up in aqueous suspension by the method above set forth. It has also been proposed to pass into the aqueous suspension of the oxides first gaseous ammonia and then carbonic acid or to add to the suspension ammonium carbonate or alkali carbonates.

The magnesium bicarbonate solution obtained by the action of carbonic acid under pressure or by means of the specified additions is, after separation from the solid constituents, heated to boiling whereby the voluminous basic magnesium carbonate known as "magnesia alba" is precipitated.

According to the process of the present invention from dolomite or other raw materials containing carbonates of calcium and magnesium (dolomitic limestone or magnesite containing lime) a fine grained product consisting of a mixture of the carbonates of calcium and magnesium is produced in very voluminous form and of practically always the same weight by volume.

Experiments showed that the quality of the products produced by the process can be influenced to a far reaching extent according to the method of carrying out the carbonation. According to the process of the present invention the carbonation is carried out at elevated temperatures without excess pressure in an aqueous suspension with an oxide content not exceeding 8%. The temperature of the suspension is maintained so high that magnesium bicarbonate can only be formed in quite insignificant quantities. The gas reacting with the oxides consists at least in part of carbonic acid, the remainder being inert in the process. The suspension practically free from bicarbonate, produced as a result of the action of the carbonic acid, is cooled and thereupon again treated with carbonic acid likewise at normal pressure in order to pass at least part of the magnesium carbonate precipitated therein into solution in the form of magnesium bicarbonate. The solution may be separated off. According to experiments the fineness of the precipitate depends on the conditions under which the decomposition by heat is effected, in particular on the speed of precipitation and the concentration of the bicarbonate solution.

For the practical execution of the process the burnt dolomite is slaked with water and diluted to such an extent that the oxide content of the aqueous suspension amounts to 4–8%. The suspension heated to at least 75° but better to about 90° C. is allowed for example to trickle down in a tower, the carbonic acid or gases containing the same being led in at the bottom. Alternatively the carbonic acid is introduced into the heated aqueous suspension distributed in fine bubbles. As soon as the suspension shows a neutral reaction to phenolphthalein, a condition attained at a pH-value of about 8.4, the supply of carbonic acid is interrupted and the solid constituents of the suspension, preferably after cooling, are separated from the liquid. The dried and pulverised fine grained and light product consisting of a mixture of the two carbonates, is now ready for application. If, however, a still lighter product, that is to say one of lower weight by volume, is intended to be produced, then the cooled carbonate suspension is first diluted with water to such an extent that it only contains about 1% MgO, whereupon renewed introduction of carbonic acid is commenced. The quantity of the carbonic acid is such that about ¼ of the magnesium carbonate present passes into solution in the form of bicarbonate. Thereupon the suspension is heated to boiling and the magnesium carbonate precipitated from the bicarbonate solution is deposited together with the other carbonates. The weight by volume of the separated, dried, and pulverised precipitate is remarkably low.

The carbonic acid treatment and also the discharge of the saturated bicarbonate solution and the introduction of fresh water can take place periodically or continuously. In the latter case the saturated solution is caused to be displaced by the fresh water and to pass through a filter arranged in front of the outlet opening.

The following examples illustrate the invention.

Example 1

100 kgs. of burnt dolomite are slaked with water and diluted to 2000 litres. Into the aqueous suspension containing 5% oxide and having a temperature of 90° C., carbonic acid or a gas containing the same is introduced. For this purpose suitably the apparatus according to my Patent No. 2,154,150 can be employed. As soon as the suspension is found to be neutral to the phenolphthalein, the supply of carbonic acid is interrupted, the carbonates formed separated from the liquid after allowing to stand and then dried and pulverised. There are obtained 180 kgs. of a light carbonate mixture 1 litre of which weighs 145 grams.

Example 2

Instead of the carbonates being separated from the neutral suspension obtained according to Example 1, into the suspension cooled to 20-25° C. carbonic acid is again passed until according to a test portion about ¼ of the magnesium carbonate present has passed into solution. The suspension is now for the purpose of decomposition of the bicarbonate solution formed, heated to 95° C. in a closed container, the separated mixture of the carbonates isolated from the liquid, dried and powdered. 180 kgs. are obtained of a particularly light carbonate mixture the weight of 1 litre of which is 125 grams.

The process is suitably carried out continuously in two separate carbonation plants with a cooler between them.

What I claim is:

Process for the manufacture of a voluminous product from raw materials containing the carbonates of calcium and magnesium, such as dolomite, comprising burning the raw material to oxides, producing from the latter an aqueous suspension with an oxide content not exceeding 8%, heating said suspension to at least 75° C., reacting thereon with a gas consisting at least in part of carbonic acid, the remainder being inert in the process, until the suspension shows a neutral reaction to phenolphthalein, cooling the neutral aqueous suspension and diluting the same to an MgO content of about 1%, reacting thereon with carbonic acid until about one quarter of the magnesium carbonate present has passed into solution, heating the suspension to boiling, separating from the liquid the carbonates depositing, drying and finally powdering the same.

GEORGE DE BECZE.